Oct. 15, 1940.                H. C. DOOLITTLE                 2,218,023
                              BOX STRAPPING TOOL
                            Filed June 14, 1937           7 Sheets-Sheet 1

Fig.1

INVENTOR.
HOWARD C. DOOLITTLE
BY
ATTORNEYS.

Oct. 15, 1940.   H. C. DOOLITTLE   2,218,023
BOX STRAPPING TOOL
Filed June 14, 1937   7 Sheets-Sheet 3

INVENTOR.
HOWARD C. DOOLITTLE
BY
ATTORNEYS.

Oct. 15, 1940.  H. C. DOOLITTLE  2,218,023
BOX STRAPPING TOOL
Filed June 14, 1937  7 Sheets-Sheet 4

INVENTOR.
Howard C. Doolittle
BY
Ray Lindsey
ATTORNEYS.

Oct. 15, 1940.                H. C. DOOLITTLE                2,218,023
                               BOX STRAPPING TOOL
                              Filed June 14, 1937            7 Sheets-Sheet 6

Fig. 9

Inventor
HOWARD C. DOOLITTLE
By  N. Clay Lindsey
                Attorney

Oct. 15, 1940.   H. C. DOOLITTLE   2,218,023
BOX STRAPPING TOOL
Filed June 14, 1937   7 Sheets-Sheet 7

INVENTOR.
HOWARD C. DOOLITTLE
BY
ATTORNEYS.

Patented Oct. 15, 1940

2,218,023

UNITED STATES PATENT OFFICE 2,218,023

BOX STRAPPING TOOL

Howard C. Doolittle, New Britain, Conn., assignor to The Stanley Works, New Britain, Conn., a corporation of Connecticut Application June 14, 1937, Serial No. 148,078

15 Claims. (Cl. 81—9.1)

This invention relates to a tool for tensioning metal straps about packages, boxes, or other articles, and for securing the overlapped ends of the straps together in tensioned relation.

The aim of the invention is to provide an improved tool or machine by means of which straps may be more quickly tensioned with greater facility about boxes and the like and sealed with a minimum amount of effort and fatigue, and to these ends I provide a very simple, compact, easily portable, sturdy, and effective machine by means of which the straps may be very quickly tensioned to the desired degree and with relatively slight effort; the tension is maintained during the sealing operation; the seals are automatically fed to the overlapping strap ends without danger of jamming and without any other action or attention on the part of the operator except that of moving the sealing instrumentality to sealing position; the strap about the box is automatically cut off from a supply reel or roll of strapping; and the seals and the strap ends within the seals are deformed to provide a positively locked joint; all of such operations being successively carried out with ease and facility.

My improved machine, which has many features of novelty and advantage, is relatively small, compact, and of light weight, and may be easily operated to apply binding straps about packages, boxes, and the like, under any desired tension. The machine is further provided with a magazine containing a multiplicity of stacked seals which are individually and successively fed to a sealing position and sealed about the overlapped strap ends after the unused portion of the strap has been cut off. My machine may be easily operated by levers which are conveniently located and do not interfere with one another.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings wherein I have shown, for illustrative purposes, one embodiment of the present invention and wherein like numerals indicate like parts.

In accordance with my invention, I have provided a relatively light weight portable tool having a frame 10 supporting a strap tensioning mechanism manually operated by a tensioning lever 11 and a strap sealing mechanism manually operated by a sealing lever 12. The sealing mechanism operates a shear to cut off the tensioned or applied portion of the strap S from a supply coil just prior to the sealing operation and without releasing the tension. The numeral 13 designates a magazine adapted to hold a stack of seal blanks X, and 14 refers generally to a seal feeding mechanism for feeding the lowermost seal from the magazine to the sealing mechanism prior to each sealing operation.

Figure 1:
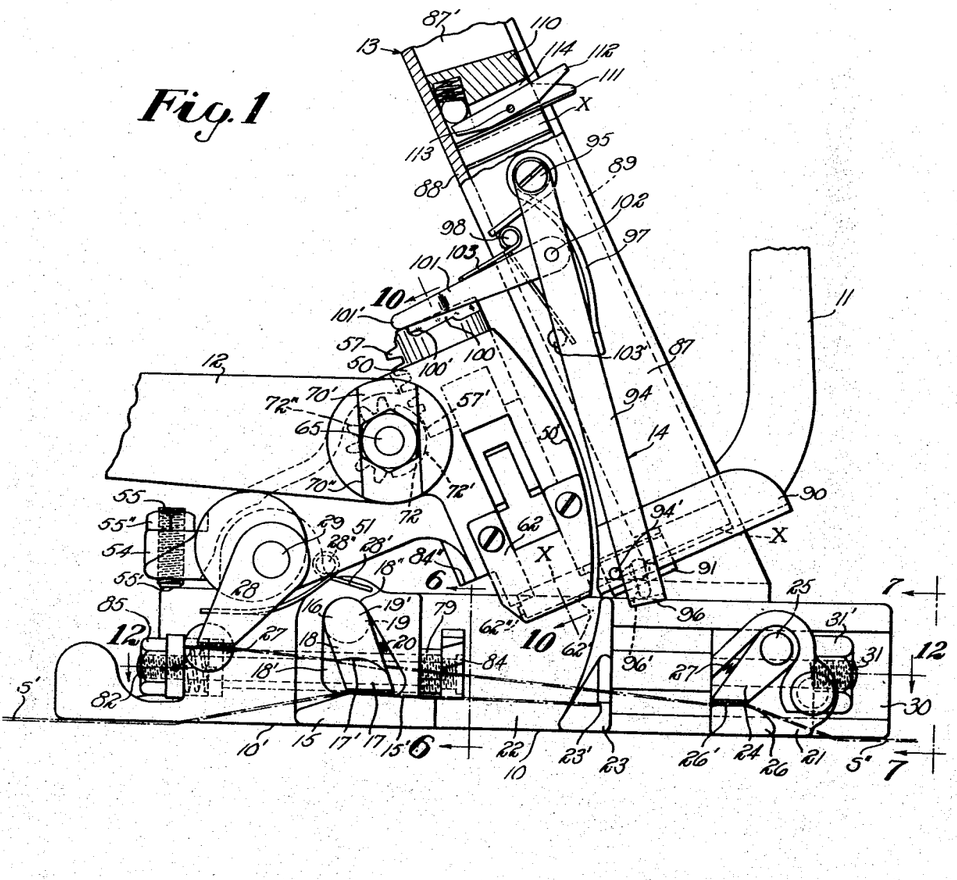
Figure 1 is a side elevation of my invention showing the various parts of my mechanism in position at the start of a strap tensioning operation.

The frame 10, which has a substantially flat bottom face 10' supporting my tool on a box or other article about which a strap is to be tensioned and sealed, has, between its ends, a laterally projecting foot 15 provided with a substantially flat strap supporting face 15'. A dog 16, which cooperates with the foot to rigidly secure one end S' of strap S to the frame during a binding and sealing operation, has a laterally extending flange 17 overlying the foot and projecting from the lower end of an arm 18, from the upper end of which laterally extends a cylindrical shank 19 journalled in a bore 19' of the frame, as shown in Fig. 1. Arm 18, which is angularly movable within a somewhat triangular shaped recess 18', has a curved upper end in mating slidable engagement with a curved upper end 18'' of the recess forming a partial continuation of the surface of bore 19' to aid in receiving thrusts when the strap end S' is gripped by the dog against the foot. The bottom of flange 17 has a multiplicity of cooperating strap engaging teeth, and arm 18 is angularly disposed towards the forward end of the frame with reference to a vertical plane through the axis of shank 19 so that a slight clockwise rotation of dog 16, as viewed in Fig. 1, will tend to move the dog into tighter strap gripping engagement. The extreme outer end of the flange 17 has an upwardly projecting lip 17' whereby there is provided on the upper surface of the flange between the lip and the arm 18 a channel or groove 17'' for receiving and guiding the other and upper strap end S''. A spring 20 within recess 18' urges the dog into strap gripping engagement and cooperates with the tensioning operation so that any slipping of the strap end S' towards the rear of the frame during a tensioning operation will urge dog 16 downwardly into tighter strap gripping engagement. Frame 10 forwardly of foot 15 is provided with a recess 22 within which strap cutting and sealing operations are performed, as will be later described. A foot 23 extending laterally from the frame at the forward side of this recess supports the forward end of strap end S' and has a shoulder 23' providing a stop to locate the strap end.

To aid in tensioning the strap about an article, there is provided a second dog 24 mounted on a movable head 21 and arranged to grip a portion of the other end S'' of strap S, and tension lever 11 is operatively connected to move this dog towards dog 16 to bring the strap into desired tensioned relation about the article being bound.

Figures 3, 6, 7:
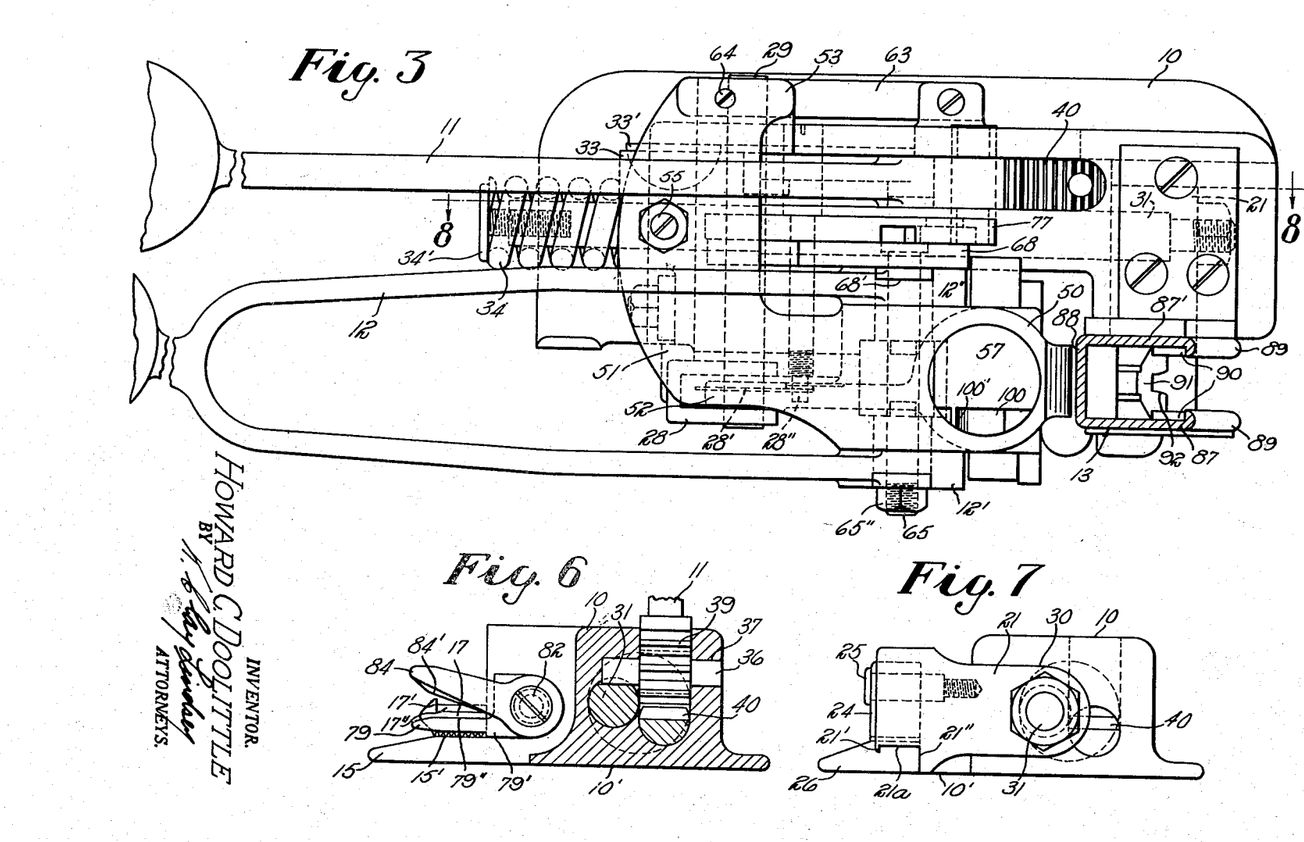
Fig. 3 is a plan view of my device with the tensioning parts in the positions shown in Fig. 2.
Fig. 6 is a sectional view taken substantially along the line 6—6 of Fig. 1.
Fig. 7 is a front end view of the frame and parts taken substantially along the line 7—7 of Fig. 1.

Dog 24, which is similar in operation to dog 16 but grips strap end S'' in opposed relation to strap end S', is angularly disposed rearwardly of a plane through the axis of a supporting shaft 25 upon which it is mounted at the upper end, as shown in Fig. 1. Shaft 25 is mounted in head 21, and the dog 24 has a rounded upper end slidably engageable with a rounded overhanging flange of head 21 to cooperate with shaft 25 in receiving thrusts imparted upon the dog during a strap gripping operation. The bottom of dog 24 has strap gripping teeth disposed above a strap supporting face 26' on a foot 26 laterally projecting from head 21 and generally in the plane of face 15' so that the dog 24 may swing downwardly into gripping engagement with the strap end S'' passing over face 26'. A spring 27 mounted in head 21 engages dog 24 and urges it into strap gripping position. The forward end of head 21 has a depending flange or lip 21' spaced from a shoulder 21'' providing a channel or groove 21a (Fig. 7) cooperating with channel 17'' to receive strap end S'' and properly locate it in overlying aligned relation with strap end S'.

As shown in Fig. 1 and later described in detail, there is provided a pair of shears in recess 22 adjacent foot 15. When it is desired to apply a strap to the article or box to be bound, the strap is passed around the box and the free end S' of the strap is slid forwardly between dog 16 and foot 15, beneath the shears, and across the recess 22, and into supported abutting relation with the shoulder 23', an operation which can very quickly be carried out with the assurance that the strap is in the right position. It will be understood that this strap end is now supported by the feet 15 and 23. The upper strap portion S'' is slid laterally and somewhat rearwardly between dog 24 and foot 26 until it engages in the channel 21a between the lip 21' and shoulder 21''. It is then inserted between the shears and engaged in the channel 17'' in the upper surface of the flange 17. It is also inserted between a boss or frame projection 27 and dog 28 cooperating with dog 24, as will be later described. It will now be seen that the strap portion S'' is in proper superimposed relation to strap end S' owing to the fact that the strap portion S'' engages in the channels.

Dog 28 is pivotally supported at its upper end on a shaft 29 and has a toothed portion at its lower end overlying projection 27 and adapted to enter into strap gripping engagement. This dog is angularly disposed generally similarly to dog 24, and the strap supporting projection 27 is preferably located rearwardly and slightly above channel 17'' of dog 16. A spring 28' suitably mounted on the end of a stud 28'' in the frame resiliently engages dog 28 to urge it into strap gripping position. Dog 28 cooperates with dog 24 in the capacity of a ratchet to prevent release of previous take-up made on strap portion S'' by the movement of head 21. When the tension lever 11 is swung upwardly to move dog 24 away from dog 16, the previously accumulated tension on strap end S'' is maintained by dog 28, and the dog 24 and foot 26 slidably engage the strap. Similarly, during the following downward movement of lever 11, dog 24 again grips the strap end S'' to provide further tensioning of the strap which now freely slides towards the rear of the tool between dog 28 and projection 27. Hence, the tension lever may be oscillated through a relatively slight angular movement to rapidly tighten the strap to desired tension.

The head 21 is slidable in a recess 30 in the forward end of the frame, and a reduced forward end of a tension rod 31 is rigidly secured to the head by a nut 31'. This rod is slidably received in a bore 32 in the frame ending in a recess 32' at the rearward end of the frame. The rearward end of the tension rod has a reduced portion 31'' slidably extending through a bore in a plunger 33 mounted for longitudinal slidable movement in recess 32' and prevented from rotation by a key 33' received within a key slot in the frame 10. A coiled spring 34 is mounted over the extended end 31'' of the tension rod and is compressed between the outer end of plunger 33 and an adjustment screw 34' threaded in the end of the tension rod. Spring 34, which normally maintains the inner end of plunger 33 abutting against a shoulder 33'' at the inner end of reduced portion 31''', serves to prevent excessive strap tensioning which may result in strap breakage, as will be later described. As the tensioning lever 11 is moved to its final downward position shown in Figs. 8 and 9, plunger 33 is shifted slightly away from shoulder 33'' further compressing spring 34 which now aids in securing lever 11 in its bottom position, as will be later described.

The tension lever is journalled at its inner end upon a short shaft 36 having flattened outer ends 36' slidably and non-rotatably received in slots in the frame, one of which is shown at 37 and the other of which lies above a cut away portion 31a of rod 31. The operative end of the tension lever is formed as a gear segment 39 enmeshed with a rack 40 rigidly secured to the frame, as by rivets, so that movement of lever 11 results in a sliding movement of shaft 36 within its supporting slots. A link 41 received at its forward end within a recess 39' of gear segment 39 has a laterally projecting pivot 41' journalled in a bore in said recess located slightly rearwardly of shaft 36. The link has a laterally projecting pivot 41'' at its rearward end journalled within a bore in the forward end of plunger 33. A shoulder 39'' at the top of recess 39' is arranged to enter into abutting engagement with top of link 41 to limit the link movement in one direction and hold the link in a position just past dead center. Hence, when a strap has been positioned between the strap gripping dogs as shown in Fig. 1, a downward movement of the tension lever 11 will serve to move dog 24 and strap end S'' towards strap end S', causing a tensioning operation and tightening of the strap about the article being bound.

In the event that a single downward movement of lever 11 is insufficient to tighten the strap to the desired extent, the handle may be swung upwardly and downwardly several times until the required tension is reached. After a predetermined tension has been reached, spring 34 will compressively yield, permitting plunger 33 to slide along the rearward portion 31'' of the tension rod and prevent excessive tensioning and breaking of strap S.

It will be observed that the tensioning mechanism constructed in accordance with the present invention is very simple in construction and light in weight, the same comprising a relatively few number of parts which may be easily made and assembled. The mechanism is very effective in that the slack in the strap may be taken up very quickly and the strap may be placed under considerable tension without requiring any considerable effort on the part of the operator.

During the major portion of the downward operative movement of the tensioning lever 11, the shaft 36 moves rearwardly due to the enmeshed engagement of the gear segment 39 with the fixed rack 40. During this movement, there is sufficient leverage present to place the strap under considerable tension. As the tensioning lever approaches the end of its operative stroke, the toggle comprising the link 41 and that portion of the operating lever between the shaft 36 and the pivot 41'' straightens out—that is, approaches a straight line passing through the centers of pivots 36 and 41''—and, therefore, the energy exerted by the operator in moving the lever is greatly multiplied so that tremendous power is had with slight effort during the final portion of the tensioning operation. As the operating handle is brought to its extreme rearward and bottom position, the pivot 41' passes through dead center to the position shown in Fig. 8, with the result that the parts are thus automatically locked in this position; it being observed that the tension of the strap tends to move the plunger 32 forwardly and the line of thrust through the link 41 is between the axis of the tensioning lever 11 and the rack 40. The segment cannot move forwardly because of its meshing engagement with the rack, and the lever 11 is held in its rearmost position due to the engagement of the shoulder 39'' against the link 41. During the final movement of lever 11 to its bottom position, plunger 33 slides away from shoulder 33'' to the position of Figs. 8, 9, and 12. At this time, pivot 41' is beneath dead center, and the compression of spring 34 now urges shoulder 39'' tightly against link 41 to lock lever 11 in tensioned position. It will further be observed that with the arrangement described the strap, after it has been manually drawn about most boxes to sufficient extent, may be tensioned with but one stroke of the tensioning lever, but if it is found in some instances that the strap is not under sufficient tension, the lever may be oscillated forwardly and backwardly slightly until the slack is properly taken up. As previously stated, the spring 34 serves to prevent excessive tensioning of the strap and breaking thereof as well as to lock the operating lever 11 in tensioned position.

Figures 4, 5:
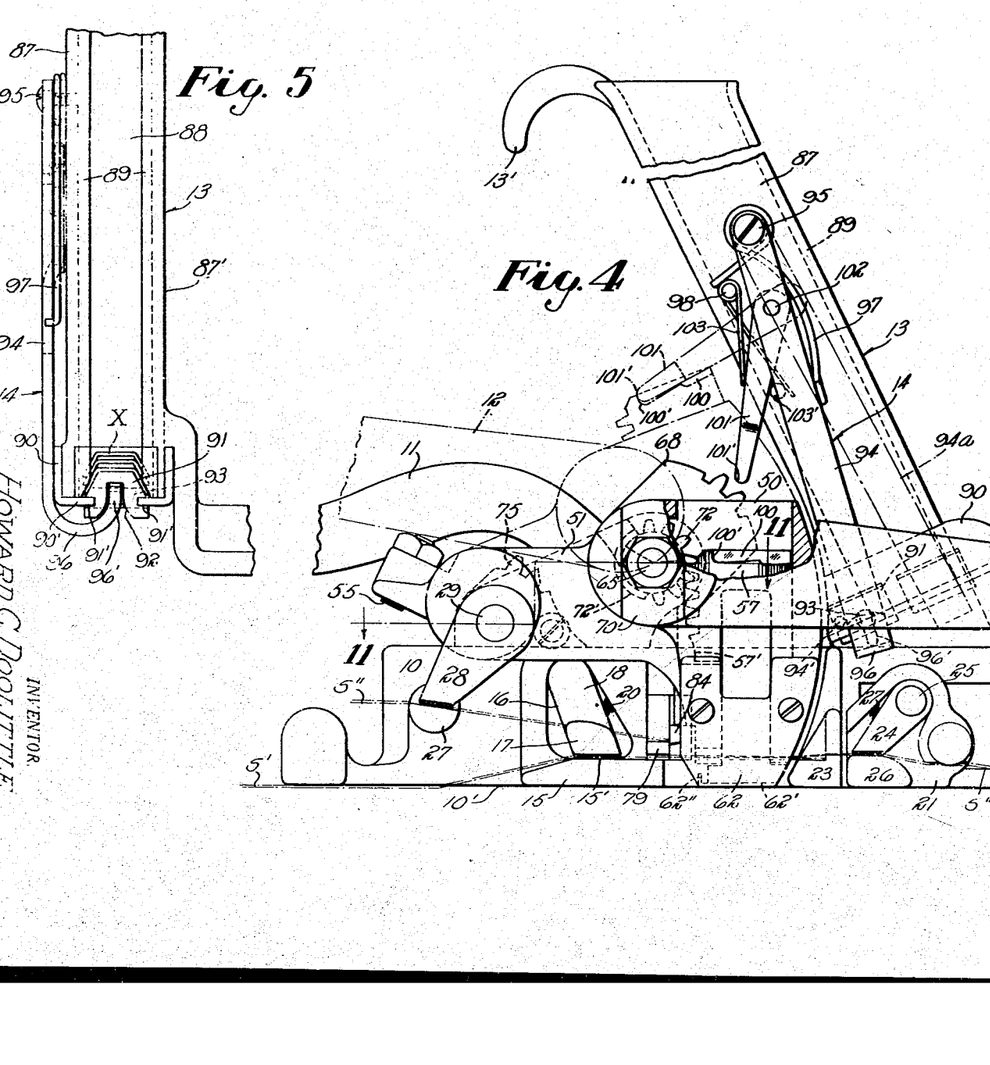
Fig. 4 is a side elevation of the side of the machine shown in Fig. 1 and showing the position of the various parts at the completion of the sealing operation.
Fig. 5 is a fragmentary view of the magazine and showing the feed mechanism associated therewith.

The sealing mechanism of my invention includes a sealing head or housing 50 adapted to be moved by sealing lever 12 from the initial inoperative position of Fig. 1, wherein it receives the lowermost seal member X from a stack of seal members within magazine 13, to the sealing position within recess 22 shown in Fig. 4. The housing 50, which may comprise a casting or other suitably formed member, is provided with a rearwardly extending arm 51 having a pair of spaced bosses 52 and 53 journalled upon shaft 29. A lug 54 on the rearward portion of the arm has an adjustment screw 55 threaded therethrough and engageable with a face 55' on the frame to adjust the sealing mechanism in a position to receive a seal blank, as will be later described. A nut 55'' locks the screw in position. The forward portion of the housing has a curved wall 50'.

Figures 8, 10, 11:
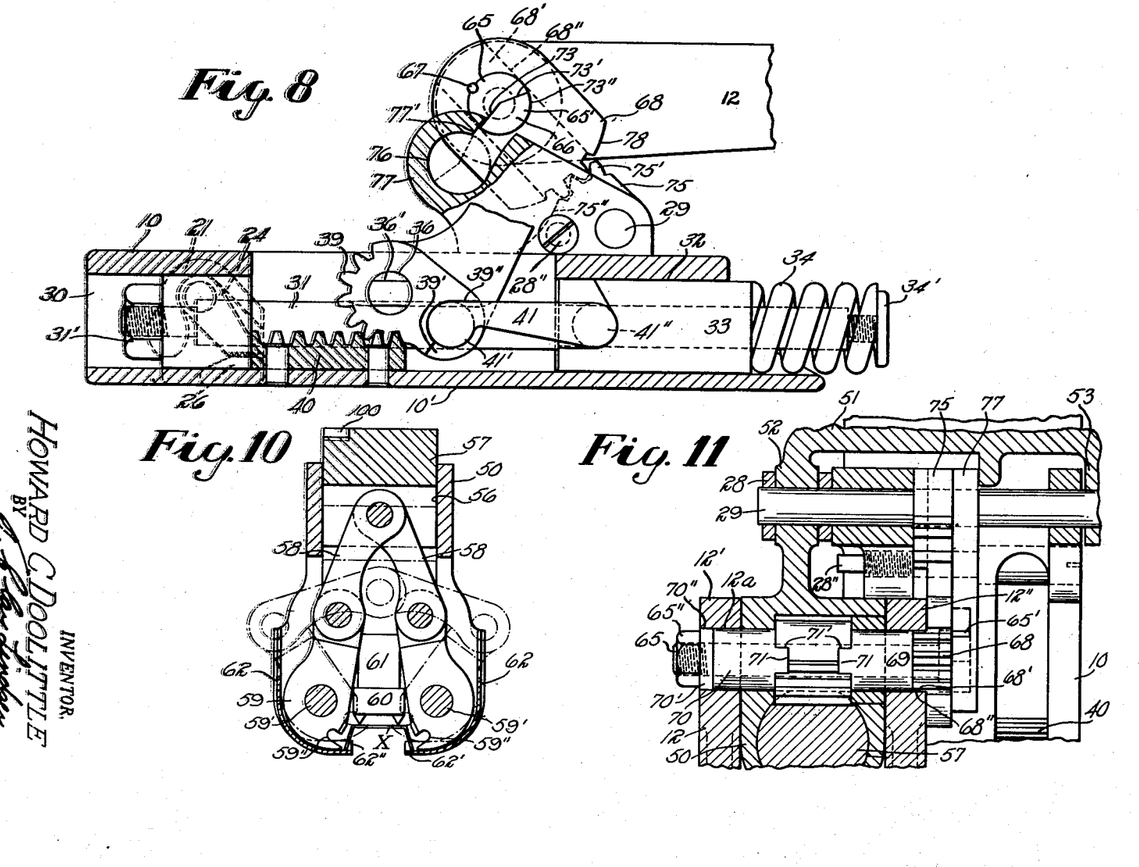
Fig. 8 is a longitudinal section taken along the line 8—8 of Fig. 3.
Fig. 10 is a section through the sealing mechanism taken along the line 10—10 of Fig. 1.
Fig. 11 is a sectional view taken substantially along the line 11—11 of Fig. 4.

The sealing mechanism is generally similar to that shown in the prior patent to Webster No. 2,007,781 issued July 9, 1935. The housing is provided with a bore 56 slidably receiving a cylindrical rack bar 57 pivotally connected at its lower end, as by a pair of toggle members 58, to a pair of sealing jaws 59 pivoted to the housing 50 on shafts 59'. An anvil 60 is supported on a transverse wall 61 at the bottom of the housing, as shown in Fig. 10. The jaws are provided at their lower inner ends with seal crimping recesses 59'', and the anvil has a plurality of downwardly extending protruding teeth cooperating therewith to indent the seal member and deform it into tight interlocked relationship with the overlapped strap portions S' and S'' in the same general manner as described in the above-noted Webster patent. The bottom of housing 50 also has a pair of spring seal supports 62 partially surrounding jaws 59 and provided with opposed bottom flanges 62' and end flanges 62'' for supporting and locating a seal member X between jaws 59 prior to a sealing operation.

A locking spring 63 (Fig. 2) is secured at one end to a projecting portion of the base and provided with an upwardly extending V-shaped portion 63' at its other end adapted to resiliently engage against the lower V-shaped end 64' of a stud 64 projecting downwardly from boss 53. The stud 64 is so positioned in boss 53 that when the housing 50 is in its uppermost position the end 64' of stud 64 lies to the left of the V-shaped end 63' of the spring 63. When the housing is moved downwardly as will be hereinafter described, the stud 64 rides over the V-shaped end 63' of spring 63, forcing it downwardly, and as the housing is raised it will ride over the spring in the reverse direction and come to rest in the position shown. When so positioned, the stud and spring tend to serve as a latch, preventing the housing 50 from lowering of its own weight and requiring the initial releasing of the stud 64 from behind the spring 63 before further movement thereof can be made by the lever 12.

Figure 9:
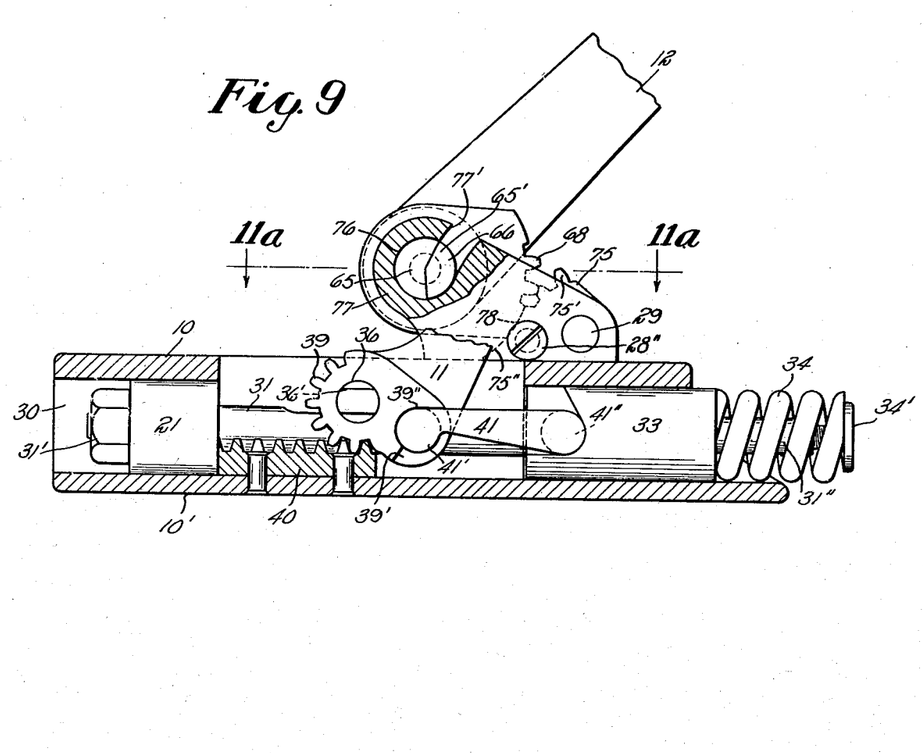
Fig. 9 is a view similar to Fig. 8 and showing the relative positions of the sealing lever and associated parts at the start of the sealing operation.
Figure 11A:
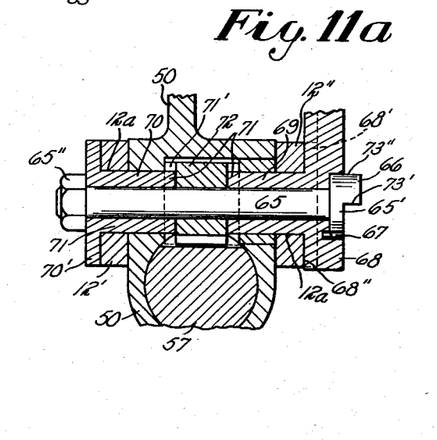
Fig. 11a is a fragmentary sectional view similar to Fig. 11 and taken along line 11a—11a of Fig. 9.

During the initial upward operative movement of sealing lever 12, housing 50, which has previously received a seal member X on the seal supports 62, is first swung downwardly about shaft 29 to the position of Fig. 9. The sealing lever 12 is bifurcated at its forward end and terminates in bosses 12' and 12" having aligned bores 12a through which passes a sealing lever bolt 65 having a head 65' at one end and a threaded portion at the other end receiving a nut 65". As best illustrated in Figs. 11 and 11a, a gear segment 68 mounted on the bolt adjacent its head is counterbored in its outer face to receive a portion of the head 65' and provided on its inner face with a laterally protruding portion 68' received within a transversely extending slot 68" of boss 12" so that the gear segment is angularly fixed with respect to the sealing lever and constrained to rotate with it. The bolt is angularly positioned relative to segment 68 as by a pin 67. The inner end of the segment is formed as a sleeve 69 projecting from protruding portion 68' and received in bore 12a of boss 12". A sleeve 70 also slidably receiving bolt 65 is itself slidably received in the bore 12a through boss 12', and the outer end of sleeve 70 terminates in a T-shaped head 70' received within a transversely extending slot 70" of boss 12'. The inner ends of sleeves 69 and 70 have opposed lateral protruding portions 71 respectively received within corresponding recesses 71' of a mutilated pinion 72 slidably mounted on bolt 65 between the sleeves. It will thus be evident that an interlocked relationship exists between the bolt 65, sleeves 69, 70, pinion 72, and gear segment 68 with the sealing lever 12, and these parts are tightly clamped in their respective positions. Pinion 72 is in the form of a mutilated gear having a plurality of teeth 72" extending partially around its periphery and a curved wall 72' forming the remaining portion thereof. The pinion 72 is adapted to operatively engage rack 57 only during a portion of the movement of sealing lever 12 as will be later described, the peripheral wall portion 72' being of such diameter that it underlies the bottom tooth of rack 57 when same is in raised position, thus serving to maintain it in said position.

Bolt head 65' is of a somewhat stepped form and cut away at its outer end, as best illustrated in Figs. 8, 9, and 11a, to provide a laterally extending sector portion 66 projecting from the outer face of the gear segment. This sector has a pair of angularly disposed faces 73 and 73' extending from the axis of the bolt and a parti-cylindrical face 73".

Figure 2:
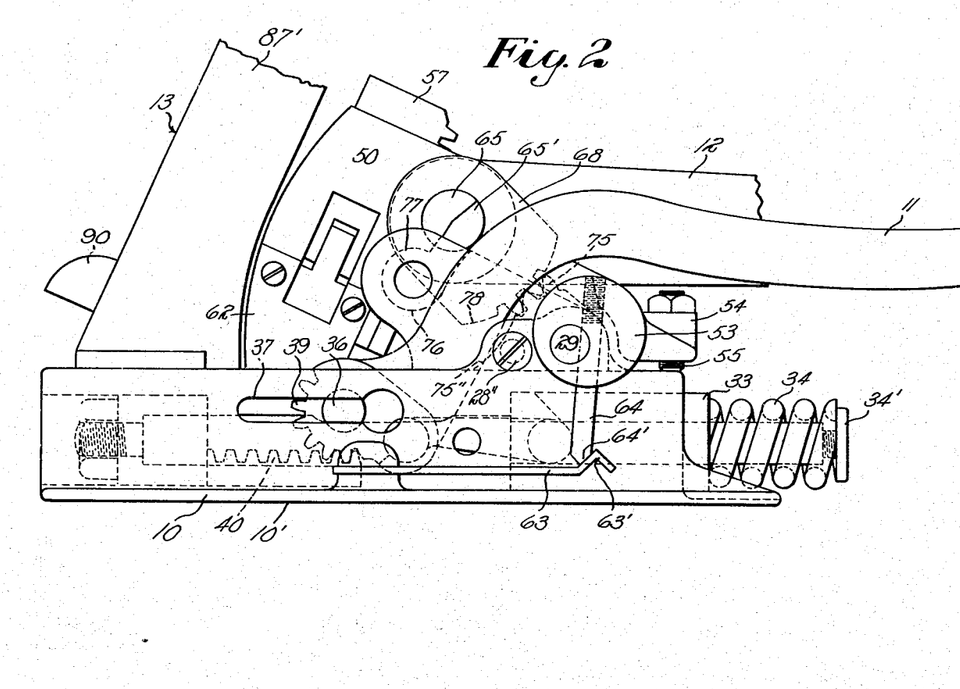
Fig. 2 is a side elevation taken from the opposite side of my machine and showing the position of the various parts when a binding strap has been tensioned about an article and before the ensuing sealing operation.

At the start of the sealing lever movement, the lever 12 is substantially horizontal, as shown in Figs. 1, 2, and 8, the bolt 65 having been rotated to rotate the mutilated pinion 72 to the position shown in Fig. 1, wherein the peripheral wall 72' thereof abuts the rack at the point 57' underlying the lowermost tooth of the rack, thus maintaining the rack 57 in its uppermost position. The gear segment 68 located on the end of the bolt 65 is located in the position shown in Figs. 2 and 8 and is in mesh with a fixed gear segment 75 secured to the frame 10. The fixed segment 75 has an upper tooth portion 75' and a lower curved end wall 75". The wall 75" is concentric with a bore 76 in a locking plate 77 which is rigidly secured to the upper side of the frame 10. The axes of the bore 76 and the bolt 65 are located at the same distance from the axis of the shaft 29 about which the housing swings so that during initial downward movement of housing 50 the bolt head will assume a swinging movement with the housing 50.

Gear segment 68 has a lower curved end wall 78 concentric with the axis of bolt 65 and having the same radius of curvature as end wall 75". The locking plate 77 is further provided with a slotted portion 77' (Fig. 8) which is arcuately disposed about the axis of the shaft 29 and merges with the bore 76. The housing is so adjusted through the adjusting bolt 55 that a portion of the sector 66 is positioned within the slotted portion 77.

Upon movement of the sealing lever upwardly from the position of Fig. 8, the face 73 of the sector 66 will engage the face of the bore 77', preventing any substantial rotation of the bolt 65, and, upon upward movement of the lever 12, the housing 50 will pivot therewith as a unit about the bolt 29 due to the engagement of gear teeth 78 of gear segment 68 with teeth 75' of the fixed segment 75. As the movement of the lever 12 continues upwardly, the sector 66 will continue to move downwardly through slot 77' until it is positioned within the bore 76, as indicated by dotted lines in Fig. 8 and full lines in Fig. 9. Any slight rotation of bolt 65 which occurs during the raising of the lever 12 is insufficient to rotate the mutilated segment 72 to bring the teeth 72" into engagement with the rack 57. However, with the sector 66 seated in bore 76, further movement of the lever 12 will cause the cylindrical face 73" of sector 66 to rotate across and out of alignment with slot 77', thus rotatably locking head 65' within the bore, and, as further downward movement of sector 66 is prevented, the housing 50 will remain stationary. The rotation of the sector 66 and bolt 65 will now cause rotation of the mutilated pinion 72, bringing the teeth 72' thereof into engagement with the rack 57.

With the housing now held in fixed position, the bolt will be moved downwardly therein, causing the toggles 58 pivotally carried thereby to be moved outwardly, pivoting toggles 59 about the toggle pins 59' carried by the housing and urging the jaws 59" towards sealing position. Similarly, during the return movement of sealing lever 12 from its forward or sealing position to the position shown in Fig. 9 to open the jaws 59, sector 66 will be rotatably locked within bore 76 until the face 73' is again located adjacent the upper face of slot 77'. During the reverse rotation of sector 66 within bore 76, the teeth 72" will again move the head 57 to its uppermost position and the peripheral shoulder 72' will be positioned against the surface 57' of bolt 57. Upon further movement, the housing and bolt will now move as a unit, and, as sector 66 is aligned with slot 77, they will pivot about the bolt 29, lifting the housing out of sealing position. It will thus be evident that the sector 66 can only move through slot 77' when it is in one of the two initial positions shown in Figs. 8 and 9. Consequently, the gear teeth of mutilated pinion 72 engage the teeth of bolt 57 only when the sector 66 is rotatable in bore 77 and the gear teeth of segment 68 will enter into and out of enmeshed relation with the teeth on fixed segment 75 only when the parts are in predetermined angular positions relative to slot 77', and there is no possibility of jamming the mechanism or of operating the sealing jaws 59 when head 65' is out of journalled relation with bore 76, nor is there any possibility of an upward swinging movement of housing 50 about shaft 29 until the sealing jaws have been fully opened to the position indicated in Fig. 10.

Figure 12:
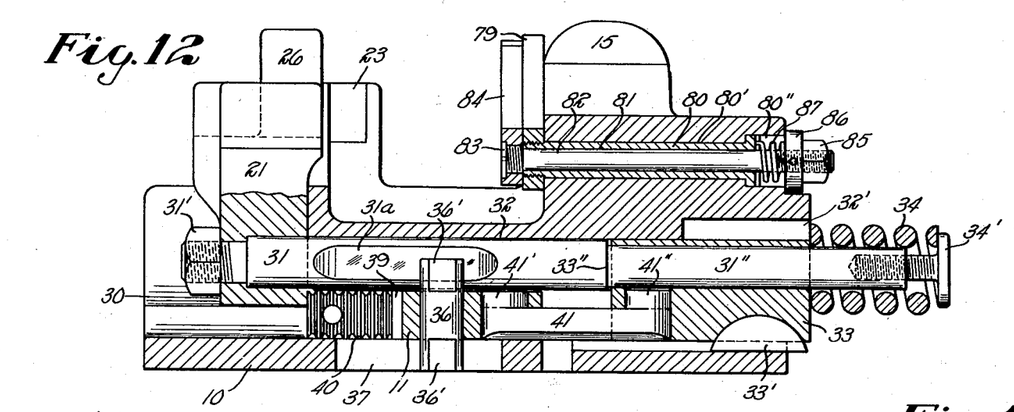
Fig. 12 is a sectional view taken along the line 12—12 of Fig. 1 and showing the tensioning mechanism.
Figure 13:
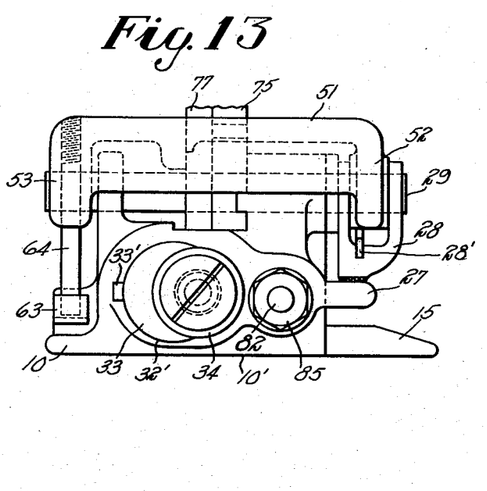
Fig. 13 is a fragmentary rear end view of my invention.

Strap end S", which extends rearwardly beyond sealing position, is cut off by a pair of shears during the downward movement of the sealing mechanism just before the housing 50 reaches its lowermost or sealing position so that the sealing operation occurs immediately after the strap has been cut off and while the housing is pressing the overlying strap ends together. A bottom shear 79 supported on a shoulder 79' in the rearward end of recess 22 is located just forwardly of and above foot 15 so that strap end S' may pass freely between the foot and shear. This bottom shear is rigidly held in position by a sleeve 80 extending through a bore 80' in the frame from a counterbore 80'' and having a threaded end screwed within the shear and a head seated within the bottom of counterbore 80'', as shown in Fig. 12. A bore 81 through the sleeve rotatably supports a shear shaft 82 having a head 83 at its forward end threaded within an upper shear 84 so that angular movement of the shear will result in a corresponding movement of shaft 82 within sleeve 80. The upper shear 84 is provided with a knife edge 84' cooperable with a knife edge 79'' on the lower shear to cut off strap end S'' passing therebetween. The rearward end of shaft 82 is threaded to receive a pair of nuts 85 and 86 locked against each other to secure the movable jaw 84 in position, and a coiled torsion spring 87 has protruding ends respectively received within the fixed head of sleeve 80 and in nut 86 so that a resilient upward movement will be imparted to the upper shear 84 tending to maintain it open. It will be appreciated, of course, that adjustment of lock nuts 85 and 86 on shaft 82 will serve to adjust this resilient upward movement of shear 84 after sharpening the shears.

The lower portion of housing 50 has a rearwardly disposed shoulder 84'' engageable with shear 84 to move it downwardly and cut off the unused portion of strap end S'' just prior to the time when the housing reaches its final downward and sealing position and before a sealing operation. This cutting off of the strap occurs just prior to the seating of bolt head 65' within bore 76. Further upward movement of the sealing lever at this time shifts housing 50 to its final sealing position as limited by the seating of bolt head 65' within bore 76, after which the ensuing upward movement of lever 12 causes a rotation of pinion 72 about its axis to move into engagement with the rack 57 and shift the rack downwardly within bore 56 and shift jaws 59 to the dot-dash position of Fig. 10, causing a sealing operation on a seal member between the jaws.

The magazine 13 comprises a rectangular open ended box-like structure secured to and angularly extending upwardly from frame 10 and having opposed side walls 87 and 87' interconnected by a rear wall 88. A convenient handle 13' may be provided at the top of the magazine to aid in carrying the tool. The forward portion of the side walls are bent over into a pair of opposed spaced lips 89 between which access may be had to a stack of seal members X within the magazine. As shown in Figs. 4 and 5, a pair of brackets 90 secured to the bottom of the side walls have inwardly protruding opposed flanges 90', and a seal feeding member 91 has opposed grooves 91' respectively receiving the ends of these flanges to slidably support the seal feeding member. A stack of seal members X is piled in superimposed relation within the magazine on the seal feeding member, and the upper contour of the feeding member is preferably of such shape as to slidably fit within the lowermost seal member in the magazine. These seal members are urged downwardly by a weight member which will be later described.

Feeding member 91 is further provided with a longitudinally disposed groove 92 in its under side across which extends a pin 93. An operating lever 94 pivotally mounted at its upper end on a screw 95 in side wall 87 has a curved lower end 96 extended beneath the magazine and bent back upwardly into a forked portion 96' receiving pin 93. A swinging movement of lever 94 results in a corresponding sliding movement of member 91 on supporting flanges on members 90. A spring 97 supported on a screw 95 is resiliently engaged between a stud 98 in magazine wall 87 and lever 94 to urge the lever towards housing 50 to the full line position illustrated in Figs. 1 and 4, and a pin 94' projecting from wall 87 limits the extent of lever movement in this direction.

The lowermost seal member X in the magazine is automatically fed from the bottom of the stack of seal members onto the seal supports 62 and between the open sealing jaws 59 just as housing 50 reaches its top inoperative position after a sealing operation. The upper end face of rack bar 57 has a recess 100 in the general form of a sloping stepped slot terminating at its inner end in a rounded face 100'. This recess is arranged to receive a rounded end 101' of a lever 101 pivoted, as by a pin 102, to arm 94 near its upper end. A spring 103 mounted on stud 98 is resiliently engaged between lever 101 and a fixed stud 103' in side wall 87 to urge lever 101 downwardly to its bottom position against stud 103'.

As illustrated in Fig. 4, at the completion of a sealing operation while the sealing jaws 59 are still closed, lever 94 rests against pin 94' and lever 101 is in its bottom position against pin 103'. At this time, the bottom rounded end 101' of lever 101 is located directly above slot 100, and as the sealing lever is moved upwardly and rearwardly, gear 72 is rotated to move rack bar 57 upwardly in the sealing head and to bring slot 100 into engagement with the lower end of lever 101. During the ensuing upward movement of housing 50, the rounded end 101' is seated within the rounded end 100' of the recess and an outward thrust is exerted against lever 101, moving lever 94 away from the housing and past the dot-dash position 94a of Fig. 4 until feeding member 91 is slid out from under the lowermost seal member within the magazine. The stack of seal members is then free to move downwardly until the lowermost seal member is supported on the opposed flanges 90' and in front of feeding member 91. As the housing 50 and rack 57 continue their upward movement, lever 94, under influence of spring 97 and control of lever 101, is moved through a slight distance to the dot-dash position 94a, thus sliding the lowermost seal member partially out from beneath the stack and towards the housing. This lowermost seal member cannot interfere with the movement of housing 50 at this time since it is limited in its downward sliding movement towards the housing by the rounded face 50'.

When the housing nearly reaches its upper inoperative position, the bottom of slot 100 engages lever 101, in the dot-dash position of Fig. 4, and cams the rounded end of this lever out of its seated position just as the housing reaches its topmost position (Fig. 1). When lever 101 has been cammed out of its seat, spring 97 immediately acts on lever 94 to quickly drive the lowermost seal member onto the seal supports 62 where it is located by the flanges 62''. Lever 101 at this time assumes the position shown in Fig. 1 and slidably engages the top of rack bar 57. The topmost position of the housing movement may be regulated by means of adjustment screw 55 within boss 54 so that at the time a sealing blank is fed onto the seal supports 62, flanges 62' will lie in alignment with the supporting flanges 90' of brackets 90.

Slot 100 and lever 101 are so located with reference to each other that during the following downward movement of the sealing mechanism to a sealing position the rounded end 101' will not drop into engagement within the slot until rack 57 has been moved downwardly and almost to its completed sealing position to bend the seal member already between the jaws substantially to its final form so that when the jaws are opened the seal may fall between flanges 62 and out of supported position. Consequently, if the sealing lever should be moved through a partial stroke and then returned to its initial position at the start of a sealing operation, lever 101 would not be received within slot 100 and no feeding operation would be imparted to lever 94 tending to feed a second seal member onto the seal supports 62 while a seal member is already thereon and causing a jamming of the sealing mechanism.

The feeding of the seal members downwardly in the magazine is aided by a weight 110 resting on the topmost seal member and generally comprising a metal block of sufficient weight to aid the downward feed of the seal members and having a clutch frictionally locking against the rear wall of the magazine to prevent upward movement of the seal members. This block has an outwardly protruding handle 111 and a pivoted lever 112 mounted upon a pin 113 within a slot 114 for movement relative to the handle. The forward end of lever 112 engages a spring pressed ball clutch suitably received within a recess in the block and normally urged into wedging engagement with the rear wall of the magazine. The clutching action of this ball normally permits free slidable downward movement of the block but prevents upward movement of the stack of seal members except when the ball is declutched from magazine engagement by movement of lever 112 towards handle 111.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a box strapping tool, a base, a sealing mechanism including a housing pivotally mounted on the base, a pair of sealing jaws relatively movable within the housing for performing a sealing operation, means to operate the jaws, and seal receiving members on the housing respectively overlying said jaws and having locating flanges for supporting and positioning a seal member between the jaws prior to a sealing operation, a magazine, and means operated by said jaw operating means for feeding a seal from said magazine onto said seal receiving members.

2. In a box strapping tool, a frame, sealing means including a housing, a pivot supporting said housing on the frame for movement into and out of an operative position, sealing members carried by the housing, a sealing lever for shifting the housing into and out of operating position and for operating the sealing members, and means engageable between the frame and said lever for initially locking the housing and lever for simultaneous pivoting about the housing pivot to move the housing to sealing position and thereafter releasing the lever for operation of the sealing jaws.

3. In a box strapping tool, a frame, sealing means including a housing supported on the frame for movement into and out of a sealing position, sealing members carried by said housing, a pivot extending through said housing, a sealing lever mounted on said pivot for moving the housing into and out of sealing position and for operating said sealing members, and means on the frame engageable with said pivot for locking the housing in sealing position during a sealing operation.

4. In a box strapping tool, a frame, sealing means including a housing, means pivotally securing the housing to the frame for movement into and out of an operative position, a pair of sealing jaws movable on said housing, a sealing lever, a bolt pivotally securing said lever to the housing and constrained to rotate with said lever, means carried by said bolt and operatively connecting the lever to said jaws when said lever is moved about the axis of the bolt, and interengaging means between the lever and the frame causing the initial movement of the lever to swing the housing into a sealing position, after which the lever swings about the axis of the bolt to operate the jaws.

5. In a box strapping tool, a frame, sealing means including a housing supported for swinging movement into and out of operative position, sealing members movably carried by said housing, a bolt rotatable in the housing, a sealing lever secured to said bolt, operative connections between the bolt and the sealing members, a fixed gear segment on the frame, a gear segment secured to the lever for rolling engagement with the fixed segment, said segments being enmeshed only while the housing is located out of operative position, and interengaging means between the bolt and the frame causing the initial operative movement of the lever to swing the housing to a sealing position and lock it in said position, after which further movement of the lever rotates the bolt to operate the sealing members.

6. In a box strapping tool, a frame, sealing means including a housing pivoted to the frame for swinging movement to and from an operative position and having sealing members thereon, a bolt rotatable in the housing and having a laterally projecting sector-shaped head, means rotatably connecting the bolt to the sealing members, a sealing lever secured to said bolt, a gear segment fixed on the frame, a gear segment fastened to the lever and enmeshed with said fixed segment, said segments disengaging from enmeshed relation when the housing reaches an operative position, and a locking plate secured to the frame and provided with a cylindrical recess for rotatably receiving the sector and having an open ended slot connecting with said recess for slidably and non-rotatably receiving said sector during the swinging movement, said sector rotatably seating in the recess and locking the housing in position during operation of the sealing members.

7. In a box strapping tool, a frame having a flat bottom surface, sealing mechanism including a housing carried by the frame for movement into and out of operating position, a single lever for moving said housing into and out of operating position, a magazine carried by the frame for supporting a stack of seal members in alignment with said housing when in inoperative position, means for feeding seals from said magazine, said means lying in the path of movement of said sealing means and operated in response to the movement of the sealing mechanism out of operating position for individually feeding said members to the sealing means.

8. In a box strapping tool, a frame having a flat bottom surface, sealing means carried by the frame and including a housing movable into and out of operative position, sealing jaws carried by the housing, a single lever for swinging the housing into and out of operative position, and an operative connection between the lever and the jaws for operating the latter after the housing has been brought to operative position; a magazine mounted on the frame and arranged to support a stack of seal members in alignment with said sealing jaws when in inoperative position, a feeding member for moving the seal members one by one from the magazine to a position between the jaws, and means lying in the path of and controlled by the movement of the sealing means for operating said feeding member to feed a seal member to a position between the jaws when the sealing means is moved to inoperative position.

9. In a box strapping tool, a frame, sealing means including a housing movable into and out of operative sealing position and having movable jaws thereon, a rack movable in said housing and operatively connected to said jaws, a lever for shifting the housing into and out of operative position and for operating the rack, a magazine mounted on the frame and arranged to support a stack of seal members, a feeding member movable beneath the magazine towards and from the housing, the lowermost seal member of said stack being slidably engaged by and supported by said feeding member, and means operatively engaged by the rack after a sealing operation to withdraw the feeding member from beneath the lowermost seal member and feed the seal member between said jaws.

10. In a box strapping tool, a frame, sealing means carried thereby and including a housing arranged for swinging movement on the frame into and out of operative position, sealing jaws carried by the housing, a rack in the housing and operatively associated with said jaws, and a lever for swinging the housing into and out of operative position and for operating the rack; a magazine mounted on the frame and arranged to support a stack of sealing members, a seal feeding member arranged to feed the lowermost sealing member of the stack to a position between said jaws, and means controlled by the rack for operating said feeding member when the sealing means is raised to inoperative position.

11. In a box strapping tool, a frame, sealing means thereon including a housing movable into and out of operative position, sealing jaws carried by the housing, a lever for moving the housing, and connections between the lever and jaws arranged for operating the latter only when the housing is in operating position; a magazine for supporting a stack of sealing members, a feeding member for moving the lowermost seal member from the stack to a position between the jaws when the housing is moved to inoperative position, and an operative connection between said sealing means and feeding member preventing operation of the feeding member until after the precedingly fed seal member has been partially deformed by the jaws causing the lowermost seal to be fed to the sealing jaws when the sealing means is raised to inoperative position.

12. In a box strapping tool, a frame, a housing supported on the frame for swinging movement into and out of operative position, jaws on the housing, a rack slidable in the housing and operatively connected to said jaws and having a depressed seat in its outer end, means to shift the housing to and from operative position and to operate the rack, a magazine on the frame for holding a stack of seal members, a feeding member beneath the magazine arranged for movement towards and from the housing and supporting the lowermost seal member, a spring pressed arm engaging the feeding member and normally urging it towards the housing and beneath the stack of seal members, a lever pivoted to and normally urged towards the arm, said lever having an outer end arranged to be initially received within said seat only at the start of the outward movement of the housing which thereafter serves to shift the feeding member away from the housing and out from under the lowermost seal member, and means camming the lever out of said seat when the rack reaches a predetermined position during the outward movement of the housing whereby the feeding member will move said seal member between the jaws.

13. In a box strapping tool, a frame, a housing pivotally mounted on the frame, sealing members carried by said housing, a sealing lever, a pivot pivotally mounting the lever on the housing, said pivot having operative connections with said sealing members, and means engageable between the frame and said pivot locking said lever against rotation until said housing has been pivoted to place said sealing members in operative position.

14. In a box strapping tool, a frame, a magazine for carrying a plurality of seals supported above said frame, a sealing device pivotally mounted on the frame and normally in alignment with said magazine, a single lever movable in one direction to move said sealing device from a position in alignment with said magazine to a sealing position, and in another direction to move said sealing member back into alignment with said magazine, and means for feeding a seal from said magazine to said sealing means, said means lying in the path of movement of the sealing means and operated upon movement of the sealing means to an operative position to feed a seal thereto.

15. In a box strapping tool, a frame having a flat bottom surface, sealing means supported by the frame for movement into and out of an operative position, a single lever for operating the sealing means, a magazine carried on the upper surface of the frame and in alignment with said sealing means when the latter is in inoperative position for supporting a stack of seal members, and means carried by the magazine and engaged by the sealing means when the latter is moved to inoperative position for feeding a seal member from said magazine to the sealing means.

HOWARD C. DOOLITTLE.